| United States Patent Office | 3,393,779
Patented July 23, 1968 |
|---|---|

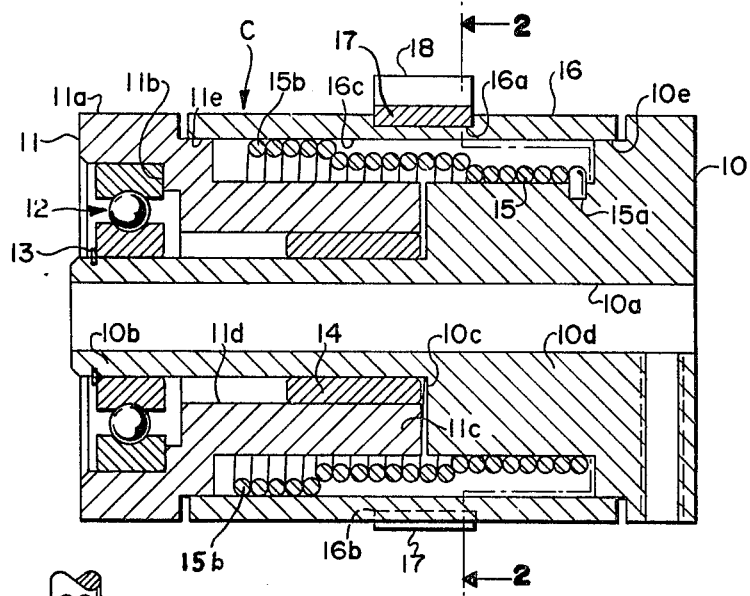
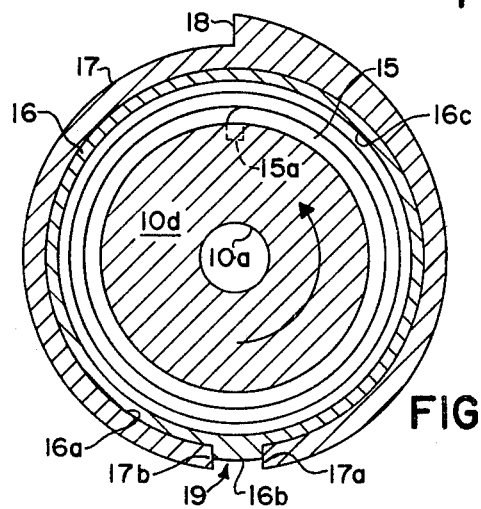
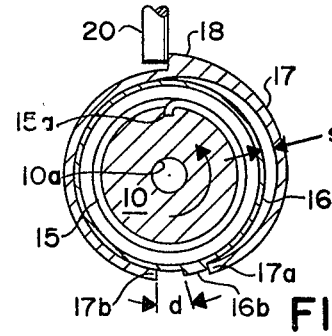
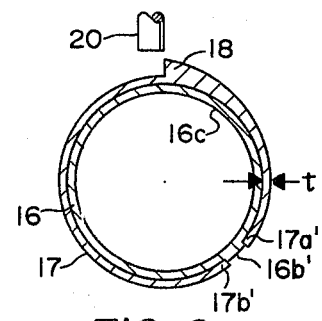
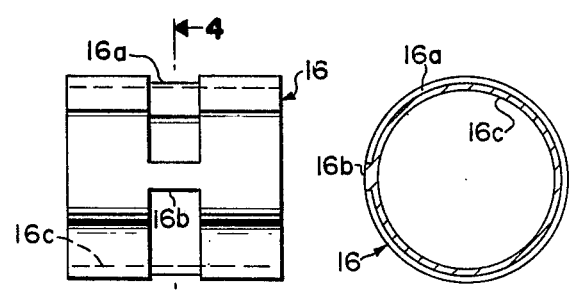
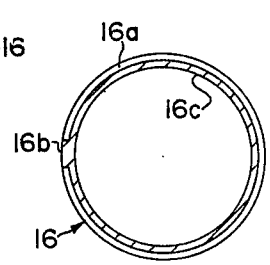
FIG. 1
FIG. 2
FIG. 3
FIG. 4
FIG. 5
FIG. 6
INVENTOR.
COLUMBUS R. SACCHINI
BY
*his* ATTORNEY

3,393,779
SPRING CLUTCH WITH MEANS FOR ABSORBING CONTROL SHOCK
Columbus R. Sacchini, Willowick, Ohio, assignor to Curtiss-Wright, Corporation, a corporation of Delaware
Filed Sept. 9, 1966, Ser. No. 578,296
8 Claims. (Cl. 192—26)

ABSTRACT OF THE DISCLOSURE

A spring clutch, the operation of which is controlled by blocking or permitting the rotation of a control sleeve, has a resilient collar mounted on the sleeve for limited flexing movement and such collar has a detent thereon arranged to be blocked by a control member. The collar provides shock buffer action between the control member and sleeve for evenly decelerating movement of the sleeve.

---

This invention is concerned with helical spring friction clutches of the normally disengaged type, i.e., wherein the clutch interconnecting a continuously running driving motor and a load is disengaged or idle for the greater portion of the motor operating time. A spring clutch of this type is disclosed by way of example in United States Patent No. 2,984,325 issued May 16, 1961, to Tomko et al.

In general, this form of normally disengaged clutch includes a control sleeve common to the input and output members or hubs of the clutch and rotating thereon when the clutch is idle. This sleeve, which closely encloses the helical clutch spring through out its length, has a detent or tab that is secured to the outer surface of the sleeve and in operative alignment with an external control device such as a solenoid plunger. When the plunger is moved into blocking alignment with the detent, rotation of the sleeve is instantly stopped; the sleeve then acts as a friction reactance member causing the helical clutch spring, which is rotating with the input hub, to tighten and contract on both hubs for friction clutching. The clutch proper is now engaged for transmitting driving torque to the load, and release or disengagement is obtained by simply actuating the solenoid to release the control sleeve detent and relax the spring.

It will be noted that in the control operation of the conventional normally disengaged type of spring clutch, instant stopping of the sleeve by the control member results in impact shock due to the inherently fast clutching action and the ordinarily high speed of the driving motor. Where, as is usually the case in the present type of clutch, a very large number of operation cycles are required, this impact shock occurring each time the clutch is engaged causes eventual wear and malfunction of the usual sleeve detent.

In accordance with the present invention, this problem is solved by incorporating in the sleeve structure a shock absorbing or buffer device which includes the detent. Thus, when the detent is engaged, the device takes up the initial shock, resulting in greatly reduced wear and rapid and smooth deceleration of the sleeve for the clutching operation.

A principal object of the invention therefore is to provide an improved helical spring friction clutch of the normally disengaged type that has broadened application, that is capable of a very large number of operations, i.e., in the order of millions of cycles without undue wear and malfunction at the sleeve detent, and that is simple and rugged in construction and inexpensive to make.

The invention will be more fully set forth in the following description referring to the accompanying drawing, and the features of novelty will be pointed out with particularity in the claims annexed to and forming a part of this specification.

Referring first to the drawing:

FIG. 1 is a sectional side view of a helical spring friction clutch of the normally disengaged type embodying the present invention;

FIG. 2 is a partial view of the clutch structure taken generally along the line 2—2 of FIG. 1;

FIG. 3 shows the integral control sleeve of FIGS. 1 and 2 for better illustrating the mounting structure for carrying the buffer collar;

FIG. 4 is a sectional view taken along the line 4—4 of FIG. 3;

FIG. 5 is a sectional view of the control sleeve and collar illustrating an indicated transient impact condition wherein the collar is stressed at the instant of control blocking; and FIG. 6 shows a modified form of the collar for obtaining resilience and shock absorbing characteristics.

Referring to FIG. 1, the clutch generally indicated by C has an input drum or hub 10 with a central shaft bore 10a that functions as a shaft adapter for the continuously running driving motor (not shown). This input or clutch drive hub has a cylindrical extension 10b terminating at the output side of the clutch whereby the drive hub unit constitutes the central core of the clutch. The output or driven hub 11 that is connected to the load, is mounted concentrically on the extension 10b and is formed as stepped cylinders of varying diameters, the outer or larger diameter portion 11a being mounted on a ball bearing 12 that is seated on the end of the drive hub extension 10b. The ball bearing 12 is suitably positioned on the extension by a retainer ring or the like 13 and by the shoulder 11b formed by the stepped construction of the driven hub 11. An inner smaller diameter portion or drum 11c of the output hub has a slight clearance at its inner end constituting the "cross-over gap" 10c with respect to the drive hub 10; this output hub drum has press-fitted within its bore 11d a position stabilizing sleeve bearing 14 that in turn has a running fit on the drive hub extension 10b. Accordingly, it will be seen in the construction so far described that the continuously running input hub 10 and the load-connected output hub 11 are adapted for free relative rotation in either direction in the absence of any clutching.

The clutching means comprises in the present form a variable diameter helical spring 15 generally of the character described in the Tomko et al. patent above that surrounds and spans the corresponding adjoining portions of the input and output hubs. The spring 15 may be provided with a tang or the like 15a at its first coil for engaging it with the input hub, and the opposite end 15b of the spring is free for friction wrapping about the output hub portion 10b during clutching. The helical spring is pretensioned somewhat by a close or "interference" fitting of the large diameter or free portion 15b within a control sleeve 16 that is mounted for rotation in the normal mode, i.e., clutch disengaged, on shoulders 10e and 11e, respectively, of the input and output hubs. A buffer collar 17 having a detent 18 is carried by the sleeve 16 and is mounted as presently described within a groove 16a therein.

As now described, the sleeve in its unblocked (normal) position rotates along with the input hub and helical spring (due to said interference fit) so that there is no relative movement between the free end portion of the spring and the sleeve, and hence no frictional force further tending to tighten and contract the spring. When rotation of the sleeve is blocked by a control member positioned in the path of detent 18, the helical spring that is fastened by tang 15a to the input hub 10 continues to rotate with the hub; the resulting friction between the pretensioned spring and the sleeve causes the spring throughout its length to wrap tightly around both the input and output hubs. This constitutes the clutching operation for establishing a torque drive connection at the "cross-over gap" 10c between the input and output hub drums 10d and 11c, respectively. Declutching is performed simply by withdrawing the control member from the detent 18 for releasing the sleeve and so causing relaxing of the clutch spring. The clearance between the spring 15 and the output hub is exaggerated in the drawing for better illustration of operation.

As pointed out above, sudden blocking of the detent 18, especially in the case of high speed drive, produces shock stresses and consequent wear over a period of many operations. The present invention overcomes this problem in a simple, inexpensive and efficient manner by providing limited buffer action between the detent and the sleeve. This buffer action is provided by means of the collar 17 that is split at 19, FIG. 2, and made, for example, of spring steel having resilience characteristics for absorbing the shock incident to blocking of the sleeve and the initial fast-acting clutch action of the helical spring.

Referring more specifically to FIGS. 2, 3 and 4, the sleeve for this purpose is formed with a lug or projection 16b that is interposed between the split ends of the collar. In the relaxed or declutched position of the spring, the sleeve lug 16b closely engages the collar edges 17a and 17b at the split.

Assuming now that the clutch is running freely (disengaged) as indicated with the sleeve rotating counterclockwise as viewed in FIG. 2, instant control blocking at the detent 18 by a control solenoid element 20, FIG. 5, first stops rotation of the collar 17 in opposition to the driving force at the sleeve lug 16b. As the sleeve tends to continue rotation due to inertia and its frictional contact with the helical spring, the collar is stressed according to the resilience characteristics of its material; its transient configuration, as indicated by tests, takes generally the form of FIG. 5, wherein the collar portion between the detent and split edge 17a is flexed or bowed slightly away from the sleeve as indicated by clearance s, and the portion at the opposite edge 17b consequently moves a short distance d away from the sleeve lug 16b. The energy so absorbed by the collar is returned to the sleeve after impact through the lug 16b for further tightening the helical spring on the output hub.

During this buffer action, the sleeve is rapidly and smoothly decelerated through the distance d, rather than stopped abruptly, for producing the reaction frictional force that is applied by the sleeve in a direction tightly to wrap the helical spring onto the now clutched input and output hubs.

The buffer or shock absorbing function can be obtained by various modifications of the collar 17; for example, the thickness of the collar at the stressed side may be suitably varied, or the relative length of the collar portions between the detent and split can be varied. This latter arrangement is shown by FIG. 6 wherein the detent is displaced a suitable amount with respect to the split part of the collar. By varying the thickness t and also the length of the collar portion 17a', considerable latitude is provided for determining the shock absorbing characteristics of the buffer collar.

Although the invention has been described as embodied in a spring clutch of the normally disengaged type wherein a large number of short-period clutch engagements are often involved, it will be understood that it can as well be used where desired in clutches of the normally engaged type. In such cases, the control sleeve and buffer collar are of essentially the same construction as described herein, the main difference being in the control operation wherein the sleeve is blocked for relaxing the spring and disengaging the clutch; clutching is performed by unblocking the detent and so causing the spring to wrap and clutch in the manner disclosed, for example, in my U.S. Patent 3,319,751 issued May 16, 1967, for "Combined Disk and Spring Clutch Assembly."

It should be understood that this invention is not limited to specific details of construction and arrangement thereof herein illustrated, and that changes and modifications may occur to one skilled in the art without departing from the spirit of the invention.

What is claimed is:

1. In a spring clutch having a continuously rotating input member in coaxial alignment with a load-connected output member, a helical clutch spring bridging said members and arranged for wrapping about and frictionally gripping said members for establishing a torque-transmitting connection to the load, and clutch control means comprising a sleeve for establishing clutching and declutching conditions enclosing the clutch spring and coaxial therewith, said sleeve being operatively related to said spring for rotating with it in one condition of the clutch and being subject to blocking by a control member for establishing the other condition of the clutch, a resilient collar carried by said sleeve means interlocking the collar and sleeve for providing limited flexing movement of the collar in opposition to the resilience thereof, and a detent secured to the resilient collar arranged to be blocked by a control member, said resilient collar thereupon providing shock buffer action between the control member and sleeve for evenly decelerating movement of the sleeve.

2. In a spring clutch as specified in claim 1, clutch control means wherein the collar is split at a section spaced a material distance from the detent.

3. In a spring clutch as specified in claim 2, clutch control means wherein the interlocking means constitutes a portion of the sleeve and an end of the collar at the split portion thereof.

4. In a spring clutch as specified in claim 2, wherein the collar is split at a section generally diametrically opposite the detent.

5. In a spring clutch as specified in claim 2, wherein the collar is split at a section for defining portions of unequal length with reference to the detent.

6. In a spring clutch as specified in claim 2, wherein the sleeve has a discontinuous groove in which the collar is mounted, the portion of the sleeve at the discontinuity being interposed between the split ends of the collar to constitute the interlocking means.

7. In a spring clutch as specified in claim 3, clutch control means wherein a lug secured to the sleeve is interposed between the collar portions at the split, said lug being normally in engagement with at least one collar portion for flexing that portion during the shock buffer action.

8. In a spring clutch as specified in claim 3, wherein the collar is made of spring steel strip, and the interlocking portion of the sleeve tends during blocking to flex and bow the coacting collar end outwardly with respect to the sleeve periphery and to cause movement of the other collar end away from the interlocking sleeve portion.

References Cited

UNITED STATES PATENTS

| | | | |
|---|---|---|---|
| 2,984,325 | 5/1961 | Tomko et al. | 192—81 |
| 2,990,043 | 6/1961 | Fink | 192—27 |
| 3,277,986 | 10/1966 | Beare | 192—26 |
| 3,319,751 | 5/1967 | Sacchini | 192—81 |

MARTIN P. SCHWADRON, *Primary Examiner.*

C. LEEDOM, *Assistant Examiner.*